April 29, 1969 N. E. CARVER ET AL 3,440,674
MACHINE FOR CLEANING SUGAR BEET SAMPLES
Filed Aug. 14, 1967 Sheet 1 of 2
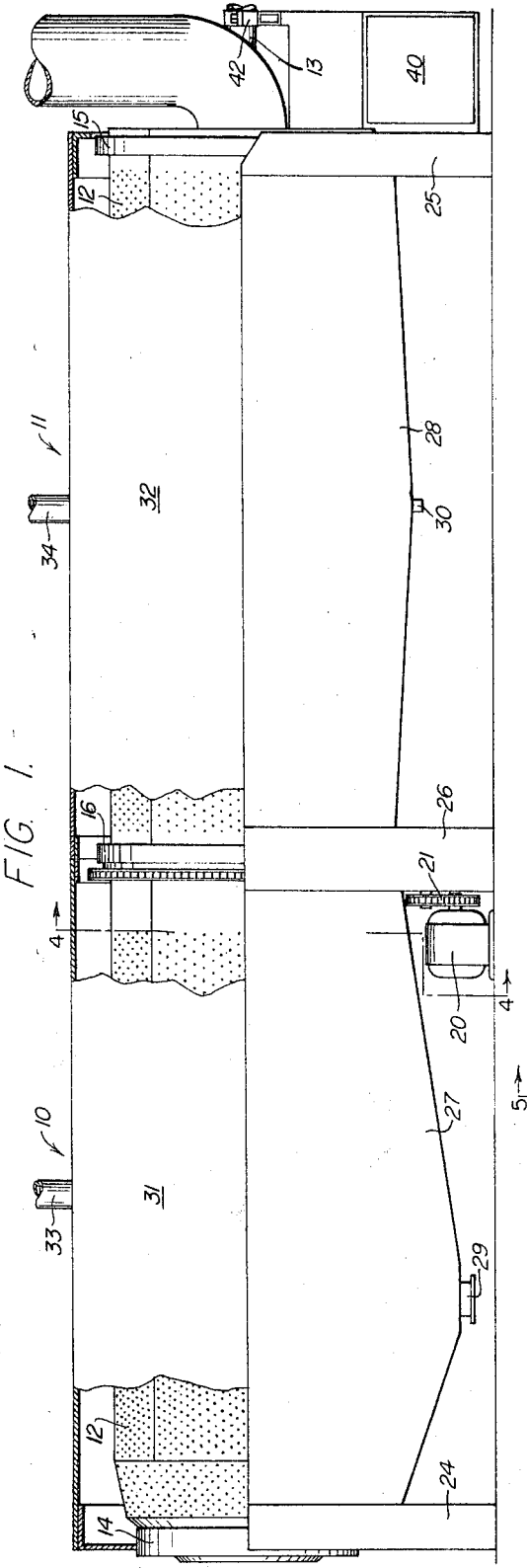
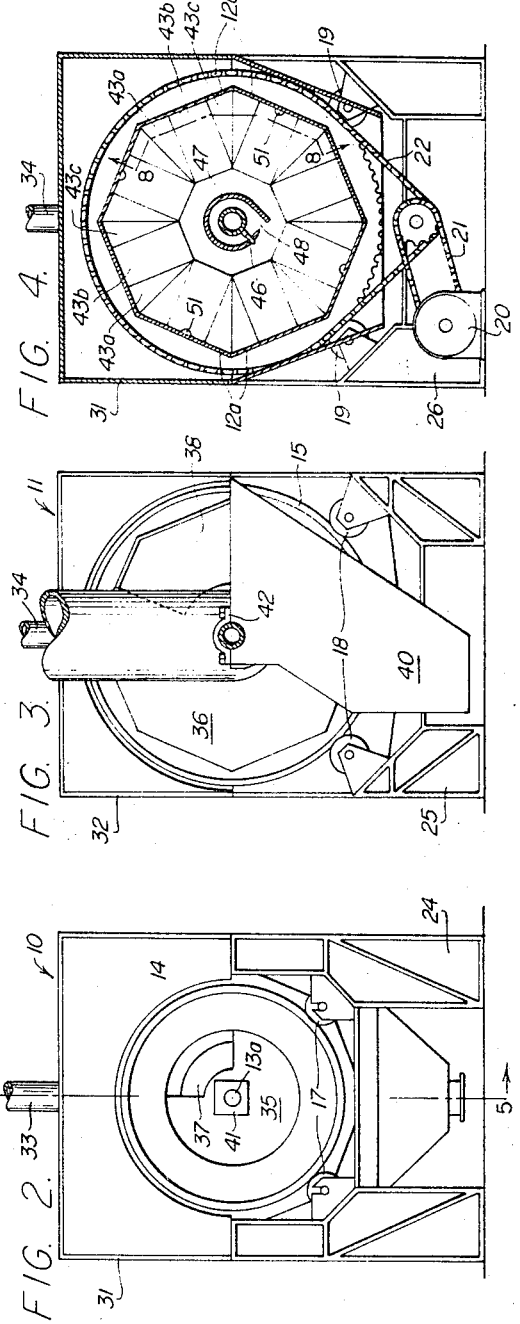
INVENTOR.
NORMAN E. CARVER
JOSEPH M. SILVER
BY
ATTORNEYS

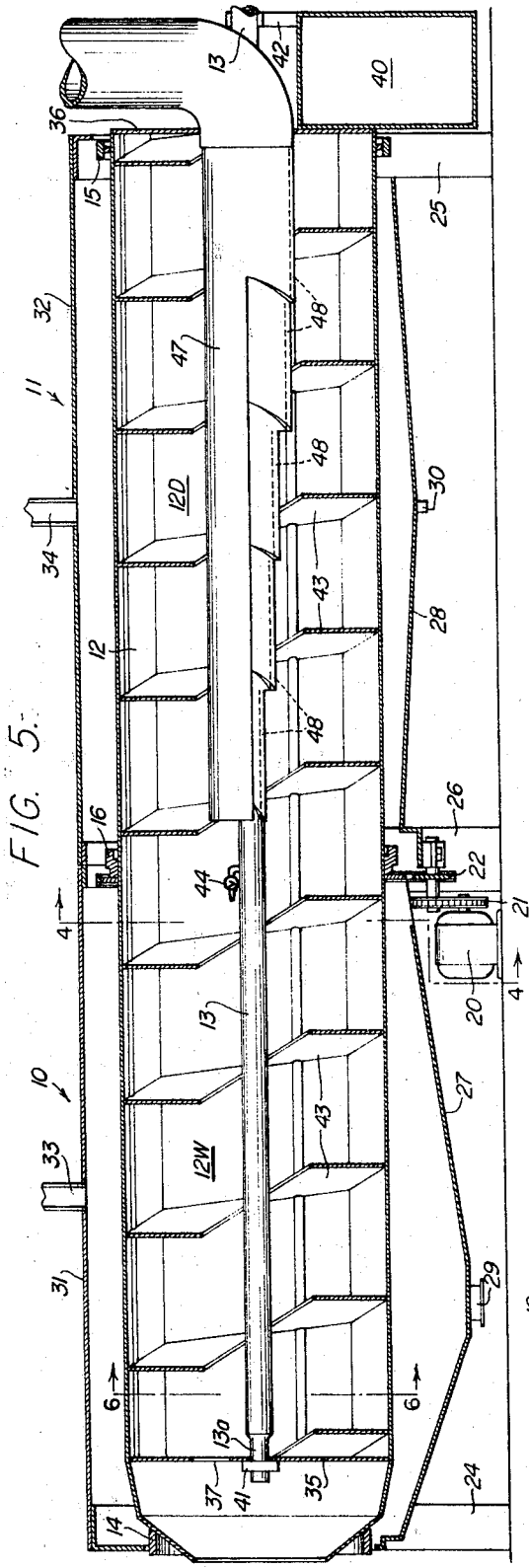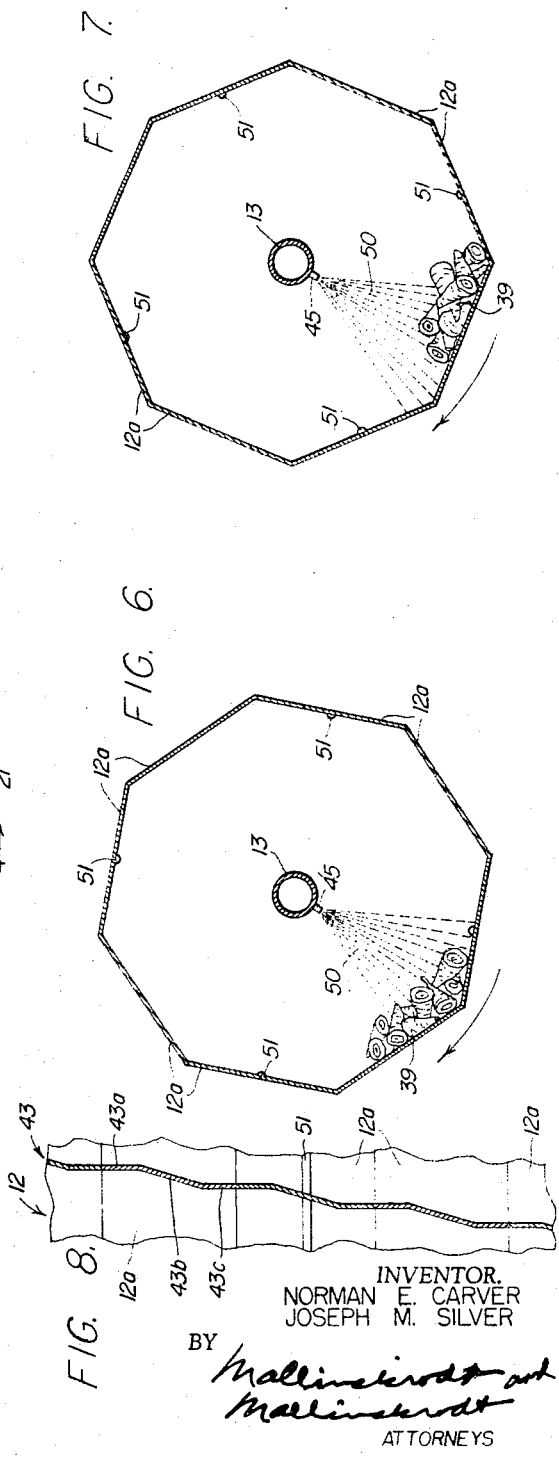

United States Patent Office 3,440,674
Patented Apr. 29, 1969

3,440,674
MACHINE FOR CLEANING SUGAR BEET SAMPLES
Norman E. Carver, Midvale, and Joseph M. Silver, Ogden, Utah, assignors to Ogden Iron Works Company, Ogden, Utah, a corporation of Utah
Filed Aug. 14, 1967, Ser. No. 660,338
Int. Cl. A23n *13/00;* B08b *3/06;* F26b *11/04*
U.S. Cl. 15—3.14                                11 Claims

ABSTRACT OF THE DISCLOSURE

A machine for cleaning individual samples of root crops, especially sugar beets, that are taken separately at intervals from respective lots of harvested crops being supplied on a continuing basis to an industrial plant for processing. The individual samples, fed to one end of an elongate, rotary drum and advanced along the length of the drum separately but successively through a washing stage and preferably through a succeeding drying stage, by means of a specially fabricated, helical wall internally of the drum, are discharged as respectively segregated, cleaned samples representative of the values contained by the respective crop lots from which they are taken.

Background of the invention

*Field.*—The invention relates to the arts of handling, washing, and drying root crops, such as sugar beets.

*Prior art.*—It is customary practice in the beet sugar industry to take samples of beets from the respective lots of sugar beets acquired from growers and to thoroughly wash adherent soil and debris from the individual beets in each sample before analyzing them for sugar content. The individual samples must be kept segregated from one another, so information obtained by analysis can be used in determining how to compensate the respective growers and how to control the course of the processing operations in the plant.

The usual way of doing this is by individually washing the respective samples in individual machines of a battery of relatively small washing machines maintained for the purpose. However, a machine has been developed heretofore for continuously receiving, washing, and discharging weighed individual samples of sugar beets on a segregated basis.

Although this machine does a reasonably good job of handling and washing the beet samples, it must be housed in a multistory building and is unduly expensive to construct and operate. Also, it embodies a cylindrical drum with longitudinally extending bars spaced circumferentially about its inner wall surface, which tend to accumulate dirt and trash. Its interior is divided transversely at intervals along its length by partition walls to provide individual compartments, through which the beets are advanced by means of a diagonal wall in and extending lengthwise of each compartment, and the entire drum is mounted on a elongate pipe for rotation therearound, the pipe being fitted with spray nozzles at intervals along its length. Difficulty has been experienced by reason of dirt and debris collecting on this pipe. The drum is perforated along its length around one half of its circumference, but is imperforate around the other half.

Summary of the disclosure

The present invention avoids accumulation of dirt and debris, without in any way impairing the functional effectiveness of the beet washer, and achieves fully as effective, if not better, washing of the beets with a machine that need not be housed in a high building and that is relatively inexpensive to construct, operate, and maintain.

This is accomplished by providing an elongate, rotary drum of polygonal rather than circular cross-section, which is perforated around substantially its entire periphery. Instead of being divided into individual sections along its length, a helical wall is made up of individual plates of isoceles trapezoid formation bent oppositely along parallel lines at its ends to provide triangular end facets and a rectangular intermediate facet. These are secured to and extend along the inner faceted wall face of the drum, end-to-end, leaving the center of the drum open along its length. An elongate, water supply pipe extends axially through the drum and is provided with spray nozzles directed laterally at an angle between the vertical and horizontal such that the beets are sprayed as they are being both carried upwardly and tumbled downwardly along a lower quadrant of the cross-section of the drum in the direction of drum rotation. The spray nozzles are placed at short intervals along the length of the pipe to provide a substantially continuous spray pattern along the length of the washing drum.

Thus, there is segregated transportation of individual sample lots of sugar beets, fed at timed intervals into one end of the drum, along the length of the continuous helical wall internally of the drum, and there is effective carrying of the beets upwardly and tumbling of them downwardly along a lower quadrant of the cross-section of the drum by reason of the polygonal configuration of the drum and the angulated nature of the helical wall transversely of and at frequent intervals along the length of such wall. Although the lifter bars that collect dirt and debris in the prior art machine are not necessary in the machine of the invention, because of the polygonal configuration of the drum, it has been found that half-round or equivalently configurated bars or strips of relatively small cross-section, placed midway of alternate facets of the polygonal inner face of the drum, aid in rolling the beets over as they commence their down travel in the drum quadrant concerned, without collecting dirt or debris in a manner to interfere with effective operation.

A spray nozzle is directed longitudinally along the spray pipe from an end thereof to dislodge any dirt or debris that might tend to collect thereon. This can be done effectively because of the continuously open character of the drum along its axis.

It is preferred to combine a beet dryer with the beet washer of the invention, by extending the length of the polygonal drum and the helical internal wall along an air supply conduit surrounding a continuation of the water supply pipe. Such conduit is advantageously convoluted and provided with graduated air-discharge openings along its length, and the drum is advantageously perforated along the dryer section of the machine as well as the washer section, but the water-supply pipe is, of course, entirely closed along such dryer section.

The drawing

The machine illustrated in the accompanying drawings represents the best mode presently contemplated of carrying out the invention with respect to combined washing and drying of sugar beets.

FIG. 1 is a view in side elevation, portions of the protective cover being broken away to reveal internal construction;

FIG. 2, an elevation of the beet feed or input end;

FIG. 3, an elevation of the beet discharge or output end;

FIG. 4, a transverse vertical section taken on the line 4—4 of FIG 1;

FIG. 5, a longitudinal axial section taken on the line 5—5 of FIG. 2;

FIGS. 6 and 7, schematic transverse sections through the drum showing the washing spray pattern and different positions of the beets during operation of the machine; and FIG. 8, a fragmentary section taken along the line 8—8 of FIG. 4 to show the angulated nature of the helical wall internally of the drum.

*Detailed description of illustrated embodiment*

The embodiment of the invention illustrated in the drawings is a combination washer and dryer for sugar beets. As previously indicated, the unique structural characteristics of both the washer and the dryer sections, 10 and 11, respectively, of the machine can be used independently. In combination, however, there is the advantage that both sections can make use, in common, of a single elongate drum 12 and of a single length of pipe 13, however fabricated. Moreover, the beets move continuously from washer section into dryer section, without interruption or intermediate handling, so maximum efficiency is obtained.

In the form illustrated, the drum 12 is supported for rotation about the pipe 13 as an axis by means of trunnions at opposite ends and at the middle of the drum. These trunnions comprise trunnion rings 14, 15, and 16, respectively, and sets of trunnion wheels 17, 18, and 19, respectively. Rotation is imparted to the drum by an electric motor 20, FIGS. 1, 4, and 5, and sprocket drives 21 and 22 located in the transition zone between washer and dryer sections of the machine. The sets of trunnion wheels are supported by spaced transverse frames 24, 25 and 26, respectively. Although this type of drive is simple and effective, any other suitable type of drive can be utilized within the skill of the art.

Drum 12 is polygonal in cross-section, being here shown as octagonal with eight longitudinally extending wall facets 12a, respectively. It is perforated, preferably completely around its periphery, there being troughs 27 and 28 below the washer and dryer sections 12W and 12D, FIG. 5, respectively, to catch wash water draining through the perforations. The troughs are secured to and serve to interconnect the frames 24, 25, and 26, and drains 29 and 30 lead from the respective troughs. Imperforate covers 31 and 32 connect longitudinally with the respective troughs and serve to completely enclose the machine longitudinally so as to protect against splash. It is desirable to also provide vents 33 and 34 in the covers.

Drum 12 is partially closed at its feed end by a plate 35 and at its discharge end by a plate 36, both of which are rigidly secured to the drum, as by welding, and restricted feed and discharge openings, 37 and 38, respectively, FIGS. 2 and 3, are provided through such plates so sample batches 39, FIGS. 6 and 7, of sugar beets to be cleaned can be fed into and discharged from the drum, substantially without splash exteriorly of the drum.

The individual batches 39 of beets to be cleaned are fed into feed opening 37 successively as the drum 12 rotates, preferably by a pan type feeder (not shown) which forms no part of the present invention, and are discharged from opening 38 after traversing the lengths of both the washer and dryer sections of the drum. The successive batches are caught individually as they are discharged from the machine, as by means of a dump type of hopper 40.

It should be noted that one end of pipe 13 is plugged at 13a and is supported in an antifriction bearing 41, FIGS. 2 and 5, carried by plate 35 and providing antifriciton rotation for drum 12; the other end of pipe 13 is rigidly clamped to frame structure 42 which supports hopper 40.

In order to propel the sample batches of beets along the length of drum 12 by reason of the rotation of such drum, a helical wall 43 extends from the feed end to the discharge end of the drum. This wall is specially fabricated by welding or otherwise securing, end-to-end, individual plates of steel, each cut and bent to provide angulated sections 43a, 43b, and 43c, FIG. 4, and by securing outer edges of these plates to the faceted inner wall face of the drum. As so fabricated, this helical wall 43 provides greater frictional resistance to passage of the beets than would a continuously smooth helical wall and causes them to tumble over on one another and to expose all surfaces to the direct action of the cleansing sprays provided along pipe 13.

Pipe 13 is provided at the discharge end of the drum with a connection (not shown) for a hose or pipe leading from a supply of cleansing water under pressure, which may be the normal water supply system serving the plant concerned in instances where normal water pressure is sufficiently high, e.g., about 150 p.s.i. It is also provided with a series of closely spaced (e.g. four inches center to center) spray nozzles 45, FIGS. 6 and 7, in and extending along the lower quadrant of pipe 13 that lies in the direction of drum rotation and within the washer section 12W. The axial centers of these nozzles preferably make a 45° angle with the vertical and the spray characteristics are preferably such as to cover the entire quadrant with a cleansing, pressure spray. A type of nozzle that gives a flat spray pattern with substantially uniform distribution has been found to be ideal. Such a nozzle can be obtained on the open market under the name "Vee Jet," as manufactured by Spraying Systems Co., Bellwood, Ill. Vee Jet Nozzle No. 1/4 U4060 has been used with excellent results.

In order to prevent debris from depositing or collecting on pipe 13, a jet nozzle 46, FIG. 5, capable of projecting a long forceful stream of wash water, is provided on top of pipe 13 at the discharge end of such washer section, so as to direct its stream along the washer portion of pipe 13. If desired, the nozzle 46 may be located at the feed end of washer section 12W, with a partition plate being interposed across the drum between washer and dryer sections.

Blasts of drying air are provided along the length of dryer section 12D of drum 12 by means of a convoluted, size-graduated duct 47, FIGS. 4 and 5, having laterally-directed, elongate, discharge openings 48 extending along respective size graduations arranged end-to-end along its length. Such duct is connected at its outer end, FIG. 1, with any suitable source (not shown) of temperature-controlled air, e.g., a conventional blower fan and heater.

In operation, respective samples 49, FIGS. 6 and 7, of sugar beets are introduced at intervals into the feed end of drum 12 through opening 37 and are continuously conveyed as segregated batches along the length of washer section 12W, into and along the length of dryer section 12D, and, finally out of the drum through discharge opening 38. They are caused to travel along the drum by reason of its rotation, and this travel is positive by reason of both the polygonal cross-section of the drum and the fabricated nature of the helical wall 43, wherein the individual angulated plates provide a multitude of angularly related facets, rather than continuous smoothness, along the length of such wall.

As drum 12 rotates, in the present instance clockwise from the standpoint of FIGS. 6 and 7, each sample 49 of beets rides upwardly with the drum through cleansing sprays 50 in somewhat the manner shown in FIG. 6, until gravity causes them to tumble back down somewhat as shown in FIG. 7. By reason of the faceted interior wall surfaces of the drum, aided by preferably half-round bars 51 applied centrally of alternate wall facets 52 and extending longitudinally thereof, the individual beets in such samples are separated and tumbled through the sprays mose effectively so all portions of their surfaces are exposed to the cleansing action of the sprays.

Whereas this invention is here described and illus-

We claim:

1. A machine for cleaning successive sample batches of sugar beets or the like, comprising
    an elongate, perforate drum polygonal in cross-section to provide a plurality of elongate wall facets extending longitudinally of the drum,
    said drum having a feed end and a discharge end and being mounted for rotation about its longitudinal axis;
    a helical wall secured to the inner face of said drum and extending lengthwise thereof, leaving the center portion of the drum open along said longitudinal axis;
    a pipe extending along said longitudinal axis and having a series of closely spaced spray nozzles extending lengthwise thereof from said feed end of the drum and directed into that lower quadrant of the drum which lies in the direction of drum rotation;
    at least one nozzle on and directed along said pipe to project a stream of wash water longitudinally along the top of said pipe to continually wash away debris that may tend to accumulate thereon;
    means for supplying wash water under pressure to said pipe; and
    means for rotating said drum.

2. A machine for cleaning successive sample batches of sugar beets or the like, comprising
    an elongate, perforate drum polygonal in cross-section to provide a plurality of elongate wall facets extending longitudinally of the drum,
    said drum having a feed end and a discharge end and being mounted for rotation about its longitudinal axis;
    a helical wall secured to the inner face of said drum and extending lengthwise thereof, leaving the center portion of the drum open along said longitudinal axis,
    said helical wall being angulated alternately in opposite directions at intervals transversely along its length;
    a pipe extending along said longitudinal axis and having a series of closely spaced spray nozzles extending lengthwise thereof from said feed end of the drum and directed into that lower quadrant of the drum which lies in the direction of drum rotation;
    means for supplying wash water under pressure to said pipe; and
    means for rotating said drum.

3. A machine according to claim 2, wherein the helical wall is fabricated from individual angulated plates secured together end-to-end.

4. A machine according to claim 1, wherein elongate beet-turning bars are secured to inner wall facets, respectively, of the drum intermediate the faces thereof, and extending longitudinally thereof.

5. A machine according to claim 1, wherein the spray nozzles are confined to a portion of the total length of the pipe lying adjacent the feed end of the drum; and wherein beet-drying means are provided along a portion of the length of said pipe lying adjacent the discharge end of the drum.

6. A machine for cleaning successive sample batches of sugar beets or the like, comprising
    an elongate, perforate drum polygonal in cross-section to provide a plurality of elongate wall facets extending longitudinally of the drum,
    said drum having a feed end and a discharge end and being mounted for rotation about its longitudinal axis;
    a helical wall secured to the inner face of said drum and extending lengthwise thereof, leaving the center portion of the drum open along said longitudinal axis;
    a pipe extending along said longitudinal axis and having a series of closely spaced spray nozzles extending lengthwise thereof adjacent to said feed end of the drum and directed into that lower quadrant of the drum which lies in the direction of drum rotation;
    means for supplying wash water under pressure to said pipe;
    means for rotating said drum;
    beet-drying means provided along a portion of the length of said pipe lying adjacent the discharge end of the drum and comprising
    an elongate flow conduit for air convoluted along its length and extending longitudinally along the pipe;
    air discharge openings in said conduit directed into that lower quadrant of the drum which lies in the direction of drum rotation;
    and means for forcing air into said conduit for discharge through said openings.

7. A machine according to claim 1, wherein the air flow conduit is size graduated along its length and the air discharge openings are elongate and extend along the length of said conduit end-to-end.

8. A machine according to claim 1, wherein the drum is perforated around its complete periphery along substantially its entire length.

9. A machine according to claim 8, wherein the drum is closed at opposite ends except for relatively small feed and discharge openings, respectively, and is jacketed along its length by imperforate trough and cover means.

10. For use in a machine for cleaning successive samples of sugar beets or the like, the combination of
    an elongate drum; and
    a helical wall secured to the inner face of the drum and extending lengthwise thereof, leaving the center portion of the drum open along said longitudinal axis,
    said helical wall being angulated alternately in opposite directions at intervals transversely along its length.

11. A combination in accordance with claim 10, wherein the helical wall is fabricated from individual angulated plates secured together end-to-end.

References Cited

UNITED STATES PATENTS

| | | | |
|---|---|---|---|
| 2,370,504 | 2/1945 | Suelflow | 15—3.11 |
| 2,684,560 | 7/1954 | Swanson | 134—65 |

FOREIGN PATENTS

| | | |
|---|---|---|
| 1,035,852 | 7/1966 | Great Britain. |

EDWARD L. ROBERTS, *Primary Examiner.*

U.S. Cl. X.R.

34—137, 138; 134—65